US012068710B2

(12) United States Patent
Kawadu

(10) Patent No.: US 12,068,710 B2
(45) Date of Patent: Aug. 20, 2024

(54) ABNORMALITY DIAGNOSIS SYSTEM

(71) Applicant: DENSO CORPORATION, Kariya (JP)

(72) Inventor: Shinsuke Kawadu, Kariya (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 17/903,134

(22) Filed: Sep. 6, 2022

(65) Prior Publication Data

US 2023/0006598 A1 Jan. 5, 2023

Related U.S. Application Data

(63) Continuation of application No. PCT/JP2021/007991, filed on Mar. 2, 2021.

(30) Foreign Application Priority Data

Mar. 10, 2020 (JP) ................ 2020-040584

(51) Int. Cl.
*H02P 29/032* (2016.01)
*B60R 16/023* (2006.01)
*H02P 5/50* (2016.01)
*H02P 29/028* (2016.01)

(52) U.S. Cl.
CPC ........ *H02P 29/032* (2016.02); *B60R 16/0232* (2013.01); *H02P 5/50* (2013.01); *H02P 29/028* (2013.01)

(58) Field of Classification Search
CPC ............... B60W 10/08; B60W 50/035; B60L 2240/421; B60L 2240/441; B60L 15/20; B60L 7/14; B60L 2200/26; B60L 2260/26; B60L 2220/16; B60L 2210/40; B60L 3/00; B60L 3/04; B62D 5/0484; B62D 5/0487; B62D 5/046; H02H 7/0844; B63B 79/30; B64C 27/08; B64C 29/0025

See application file for complete search history.

(56) References Cited

U.S. PATENT DOCUMENTS

| 10,526,066 B2 * | 1/2020 | Suzuki ............... B64C 9/06 |
| 2016/0160781 A1 | 6/2016 | Nagar et al. |
| 2018/0274472 A1 | 9/2018 | Nagar et al. |
| 2019/0173412 A1 | 6/2019 | Kawazu |

(Continued)

FOREIGN PATENT DOCUMENTS

| JP | H05-184002 A | 7/1993 |
| JP | 2005-49178 A | 2/2005 |
| JP | 2006-094574 A | 4/2006 |

(Continued)

*Primary Examiner* — Antony M Paul
(74) *Attorney, Agent, or Firm* — Oliff PLC

(57) ABSTRACT

An abnormality diagnosis system configured to diagnose an abnormality of an electric drive system mounted on a mobile body to drive a motor for moving the mobile body, includes: an information acquisition unit configured to acquire a motor output information which is information related to an output state of the motor; an output state determination unit configured to determine whether the output state of the motor is in a low output state that does not contribute to a movement of the mobile body by using the motor output information; and a diagnosis execution unit configured to diagnose an abnormality of the electric drive system when it is determined that the motor is in the low output state.

12 Claims, 11 Drawing Sheets

(56) References Cited

U.S. PATENT DOCUMENTS

2019/0241251 A1    8/2019    Atkins et al.

FOREIGN PATENT DOCUMENTS

| JP | 2007-306657 A | 11/2007 |
| JP | 2009-78745 A | 4/2009 |
| JP | 2009-83798 A | 4/2009 |
| JP | 2009-270492 A | 11/2009 |
| JP | 2014-227155 A | 12/2014 |

* cited by examiner

FIG. 3

| OPERATION OF AIRCRAFT | TAKEOFF AND LANDING | HORIZONTAL MOVEMENT A | HORIZONTAL MOVEMENT B | HOVERING | GROUND STANDBY |
|---|---|---|---|---|---|
| MOVING DIRECTION OF AIRCRAFT | VERTICAL | VERTICAL & HORIZONTAL | VERTICAL & HORIZONTAL | — | — |
| DRIVING FORCE OF AIRCRAFT | FIRST DRIVE MODE | FIRST DRIVE MODE SECOND DRIVE MODE | SECOND DRIVE MODE | FIRST DRIVE MODE | THIRD DRIVE MODE |
| LEVITATION MOTOR | OPERATING | OPERATING | SUSPENDED | OPERATING | SUSPENDED |
| PROPULSION MOTOR | SUSPENDED | OPERATING | OPERATING | SUSPENDED | SUSPENDED |

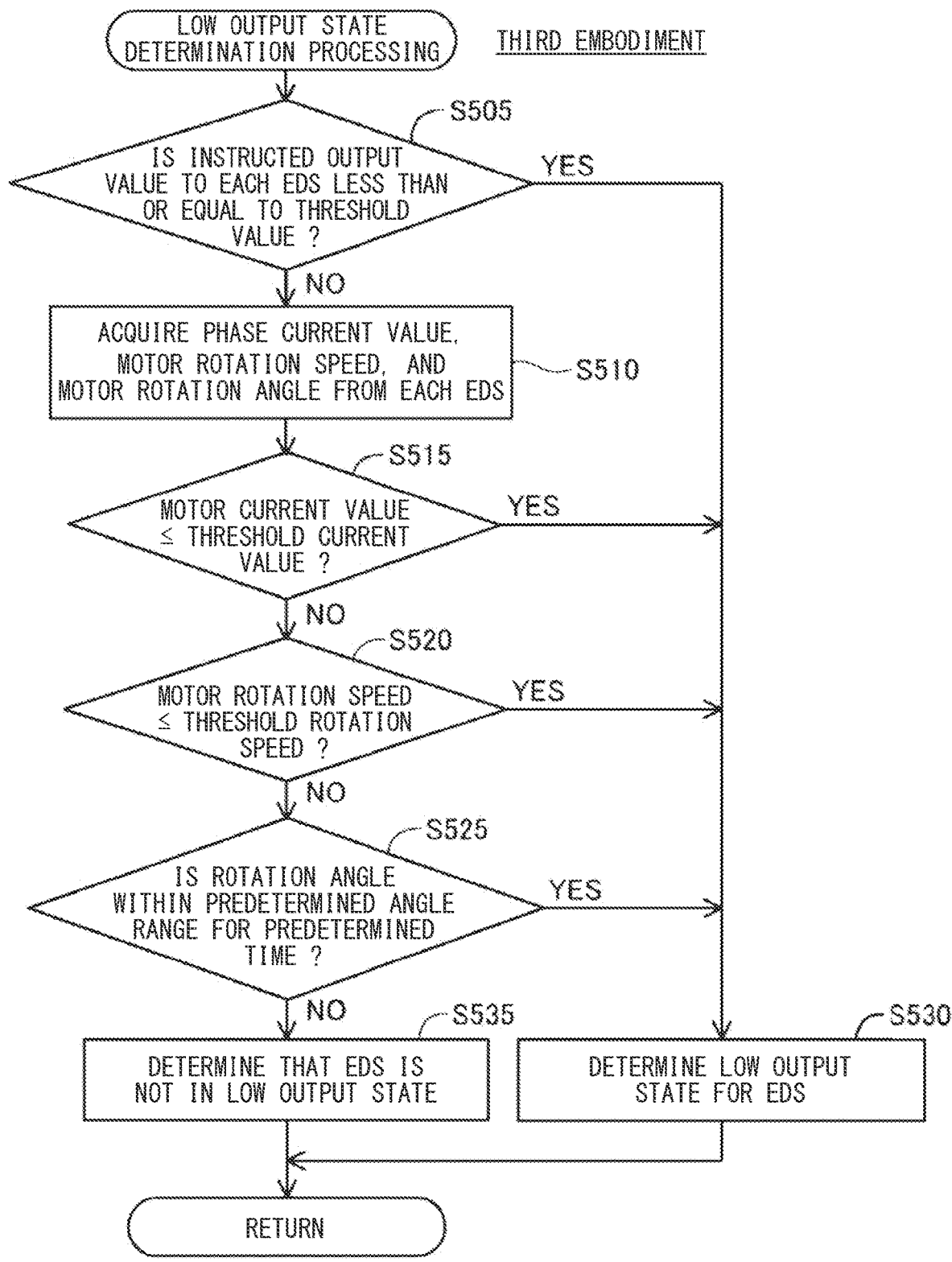

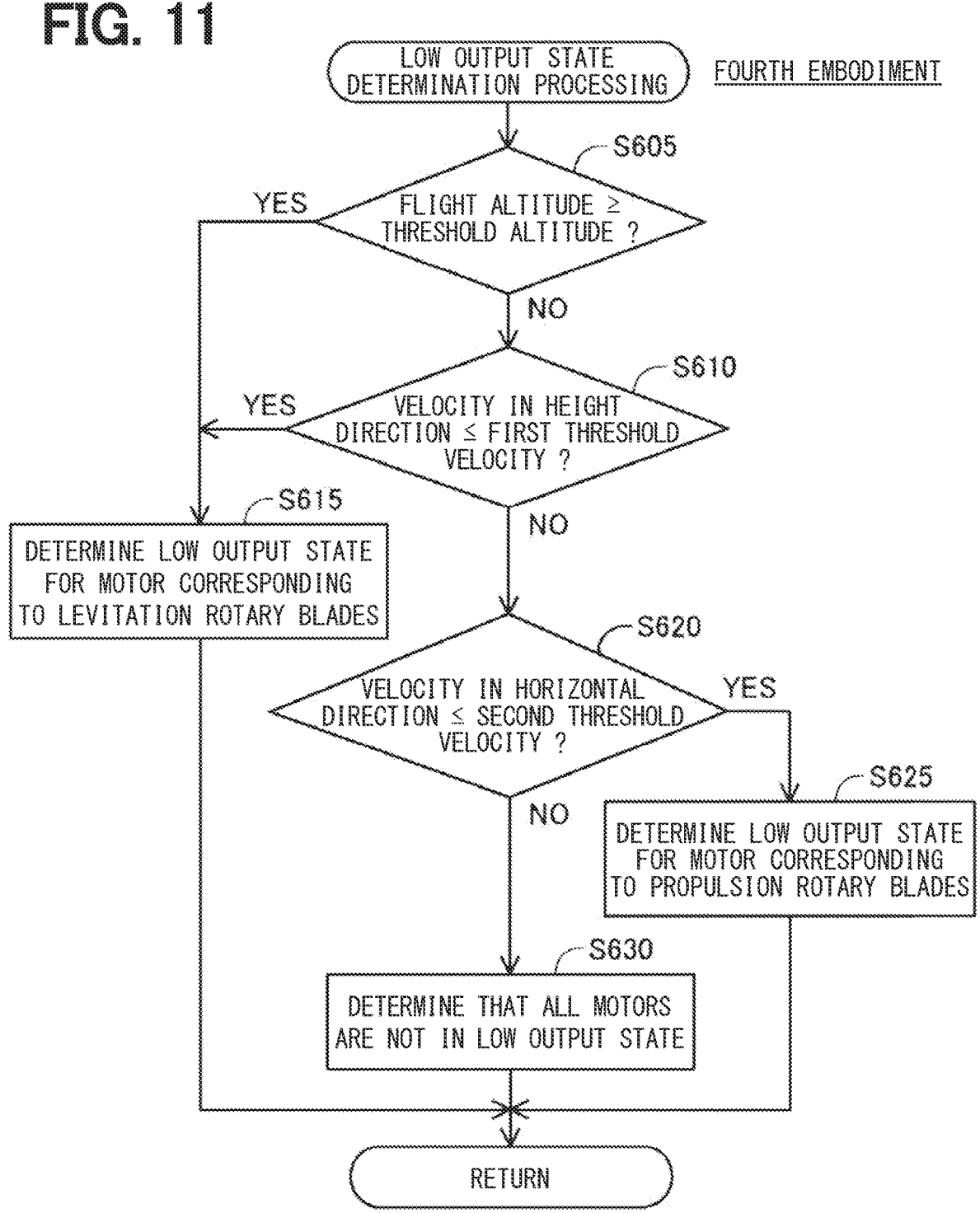

ABNORMALITY DIAGNOSIS SYSTEM

CROSS REFERENCE TO RELATED APPLICATION

The present application is a continuation application of International Patent Application No. PCT/JP2021/007991 filed on Mar. 2, 2021, which designated the U.S. and claims the benefit of priority from Japanese Patent Application No. 2020-40584 filed on Mar. 10, 2020. The entire disclosures of all of the above applications are incorporated herein by reference.

TECHNICAL FIELD

The present disclosure relates to an abnormality diagnosis system for diagnosing an abnormality in an electric drive system.

BACKGROUND

In recent years, with the electrification of a mobile body such as aircraft, vehicle, and ship, an electric drive system (EDS) for driving a motor is used for the mobile body. For example, an electric drive system having a motor and an inverter circuit is installed to rotationally drive a rotary wing of an electric aircraft such as eVTOL (electric vertical take-off and landing aircraft), a screw of a ship, or a wheel of a vehicle or a train.

SUMMARY

According to an aspect of the present disclosure, an abnormality diagnosis system is provided to diagnose an abnormality of an electric drive system mounted on a mobile body to drive a motor for moving the mobile body. The abnormality diagnosis system includes: an information acquisition unit configured to acquire a motor output information which is information related to an output state of the motor; an output state determination unit configured to determine whether the output state of the motor is a low output state that does not contribute to a movement of the mobile body by using the motor output information; and a diagnosis execution unit configured to diagnose an abnormality of the electric drive system when it is determined that the output is the low output state.

BRIEF DESCRIPTION OF DRAWING

The features of the present disclosure will become more apparent from the following detailed description made with reference to the accompanying drawings:

FIG. 3 is an explanatory diagram showing a moving direction, a driving force, and an operating state of each motor according to the type of operation of the airframe;

FIG. 10 is a flowchart showing a procedure of low output state processing in a third embodiment; and FIG. 11 is a flowchart showing a procedure of low output state processing in a fourth embodiment.

DESCRIPTION OF EMBODIMENTS

Figure 1:
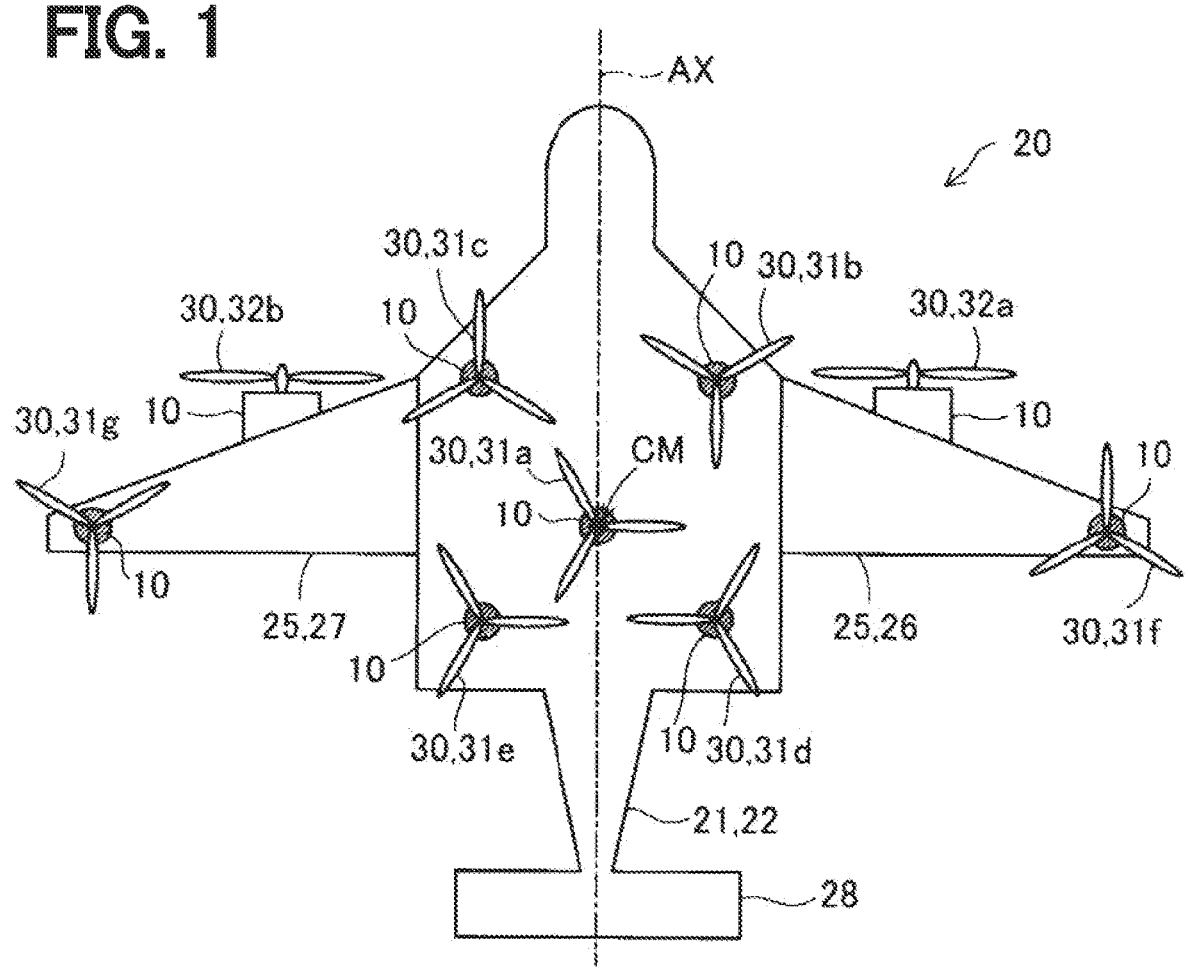
FIG. 1 is a top view schematically showing an electric aircraft to which an electric drive system is applied as an embodiment of the present disclosure.

To begin with, examples of relevant techniques will be described.

In recent years, with the electrification of a mobile body such as aircraft, vehicle, and ship, an electric drive system (EDS) for driving a motor is used for the mobile body. For example, an electric drive system having a motor and an inverter circuit is installed to rotationally drive a rotary wing of an electric aircraft such as eVTOL (electric vertical take-off and landing aircraft), a screw of a ship, or a wheel of a vehicle or a train. In such an electric drive system as well, it is desired to perform an abnormality diagnosis such as failure diagnosis of a motor, as in the conventional case. The occurrence of a failure is detected when the motor or the inverter circuit is in operation, and the location of the failure is specified.

An abnormality is detected while an electric drive system including a motor and an inverter circuit is in operation. However, there may be abnormalities that are difficult to detect when the electric drive system is in operation. For example, in case where the electric drive system includes a sensor for detecting the torque, rotation speed, etc. of the motor, it is difficult to detect the offset abnormality of the sensor while the electric drive system is in operation. The normality confirmation test of the safety mechanism (fail safe) cannot be performed unless a specific condition corresponding to the occurrence of an abnormality is satisfied. If the specific condition is intentionally satisfied during the operation of the electric drive system, the influence on the moving motion of the mobile body is very large. Such an issue is not limited to the configuration in which the electric drive system has a motor, but is common to a configuration in which the electric drive system does not have a motor or the motor is separate from the electric drive system, Therefore, a technique is desired, which is capable of performing an abnormality diagnosis of an electric drive system while suppressing the influence on the moving operation of a mobile body.

According to an aspect of the present disclosure, an abnormality diagnosis system is provided to diagnose an abnormality of an electric drive system mounted on a mobile body to drive a motor for moving the mobile body. The abnormality diagnosis system includes: an information acquisition unit configured to acquire a motor output information which is information related to an output state of the motor; an output state determination unit configured to determine whether the output state of the motor is a low output state that does not contribute to a movement of the mobile body by using the motor output information; and a diagnosis execution unit configured to diagnose an abnormality of the electric drive system when it is determined that the output is the low output state.

According to the abnormality diagnosis system, the abnormality diagnosis of the electric drive system is performed when it is determined that the output state of the motor is in the low output state that does not contribute to the movement of the mobile body. Therefore, it is possible to suppress the influence on the moving operation of the mobile body while performing the abnormality diagnosis of the electric drive system.

The present disclosure can be realized as the following embodiments. For example, the present disclosure can be realized in a mobile object equipped with electric drive system such as electric aircraft, vehicle, or ship, a method for diagnosing an abnormality in the electric drive system, a computer program for realizing the device and the method, and in a non-transitory tangible storage media on which the computer program is recorded.

A. First Embodiment

A1. Device Configuration:

An electric aircraft 20 shown in FIG. 1, also called eVTOL (electric Vertical Take-Off and Landing aircraft), is a manned aircraft capable of taking off and landing in the vertical direction and propulsion in the horizontal direction. The electric aircraft 20 includes an airframe 21, nine rotors 30, and nine electric drive systems 10 (hereinafter, also referred to as "EDS (Electric Drive System) 10") arranged corresponding to the rotors respectively.

The airframe 21 corresponds to a part of the electric aircraft 20 excluding the nine rotors 30 and the EDS 10, The airframe 21 includes a main body 22, a main wing 25, and a tail wing 28.

The main body 22 constitutes a fuselage portion of the electric aircraft 20. The main body 22 has a symmetrical configuration with an airframe axis AX as axis of symmetry. In the present embodiment, the "airframe axis AX" means an axis that passes through the center of gravity CM of the electric aircraft 20 and is along the front-rear direction of the electric aircraft 20. Further, the "center of gravity CM" means a position of the center of gravity of the electric aircraft 20 at the time of empty weight when no occupant is on board. A passenger compartment (not shown) is formed inside the main body 22.

The main wing 25 is composed of a right wing 26 and a left wing 27. The right wing 26 is formed so as to extend rightward from the main body 22. The left wing 27 is formed so as to extend leftward from the main body 22. The rotor 30 and the EDS 10 are arranged on each of the right wing 26 and the left wing 27. The tail wing 28 is formed at the rear end of the main body 22.

Five of the nine rotors 30 are arranged at the center of the upper surface of the main body 22. The five rotors 30 mainly function as levitation rotors 31a to 31e for obtaining lift of the airframe 21. The levitation rotor 31a is located at a position corresponding to the center of gravity CM, The levitation rotor 31b and the levitation rotor 31c are arranged in front of the levitation rotor 31a at positions symmetrical with respect to the airframe axis AX. The levitation rotor 31d and the levitation rotor 31e are arranged behind the levitation rotor 31a at positions symmetrical with respect to the airframe axis AX. Two of the nine rotors 30 are located on the right wing 26 and the left wing 27, Specifically, the levitation rotor 31f is arranged at a tip of the upper surface of the right wing 26, and the levitation rotor 31g is arranged at a tip of the upper surface of the left wing 27.

Further, two of the nine rotors 30 are arranged on the right wing 26 and the left wing 27, and function mainly as propulsion rotors 32a and 32b for obtaining the propulsive force of the airframe 21 in the horizontal direction. The propulsion rotor 32a arranged on the right wing 26 and the propulsion rotor 32b arranged on the left wing 27 are located at positions symmetrical about the aircraft axis AX. The rotors 30 are rotationally driven independently of each other around its own rotation axis (shaft 18 described later). Each of the rotors 30 has three blades arranged at equal intervals from each other.

Figure 2:
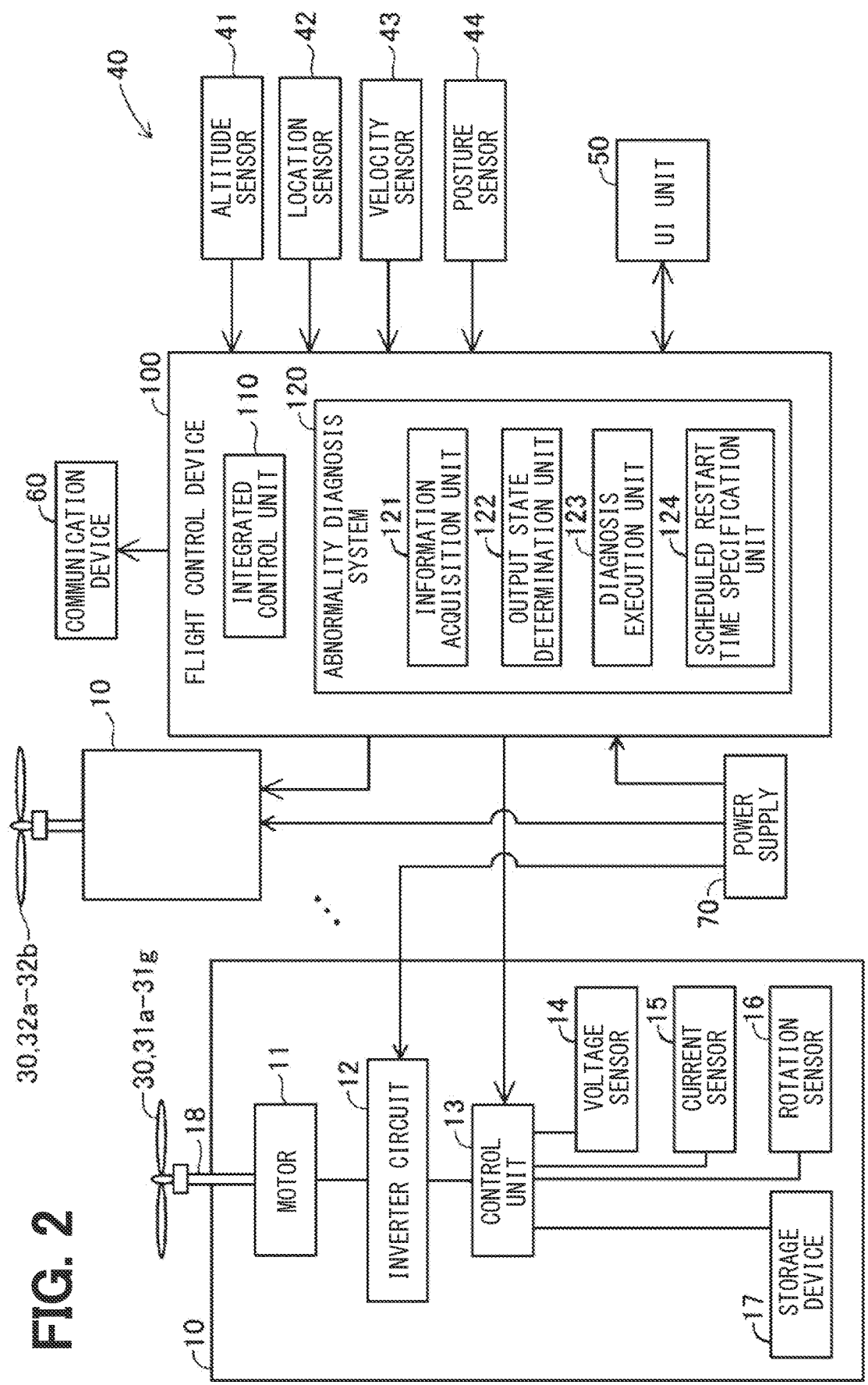
FIG. 2 is a block diagram showing a functional configuration of the EDS.

As shown in FIG. 2, the EDS 10 includes a motor 11, an inverter circuit 12, a control unit 13, a voltage sensor 14, a current sensor 15, a rotation sensor 16, a storage device 17, and a shaft 18.

The motor 11 rotationally drives the rotor 30 via the shaft 18. In the present embodiment, the motor 11 is composed of a three-phase alternating current brushless motor, and rotates the shaft 18 according to the voltage and current supplied from the inverter circuit 12. The motor 11 may be configured by any kind of motor such as an induction motor or a reluctance motor instead of the brushless motor.

The inverter circuit 12 has power elements such as an IGBT (Insulated Gate Bipolar Transistor) and a MOSFET (Metal-Oxide-Semiconductor Field-Effect Transistor), and switches at a duty ratio according to a control signal supplied from the control unit 13 to supply drive power to the motor 11. The control unit 13 is electrically connected to the flight control device 100 described later, and supplies a control signal to the inverter circuit 12 in response to a command from the flight control device 100.

The control unit 13 controls the EDS 10 as a whole. Specifically, the control unit 13 generates a drive signal in response to an instruction from the integrated control unit 110 described later, and supplies the drive signal to the inverter circuit 12. Further, the control unit 13 feedback-controls the inverter circuit 12 using the detection values of the sensors 14 to 16. In the present embodiment, the control unit 13 is composed of a microcomputer having a CPU, a ROM, and a RAM.

The voltage sensor 14 detects the voltage supplied from the power supply 70 described later. The current sensor 15 is provided between the inverter circuit 12 and the motor 11 and detects the drive current (phase current) of each phase of the motor 11. The rotation sensor 16 detects the rotation speed of the motor 11. The detected values of the voltage sensor 14, the current sensor 15, and the rotation sensor 16 are stored in the storage device 17 in time series and output to the flight control device 100 via the control unit 13. The various control programs, the detection values of the sensors, the results of diagnostic processing and the history of abnormal diagnosis results executed by the user (hereinafter referred to as "diagnosis history") are recorded in the storage device 17.

As the control mode of the EDS 10, a start mode, a RUN mode, an end mode, a standby mode, an abnormality mode, and an abnormality diagnosis mode are preset. The start mode is an operation mode immediately after the power is turned on, and the normality check of the sensors 14 to 16 is performed. The RUN mode is an operation mode for driving the motor 11, The RUN mode further includes a power save mode that limits the output of the motor 11. The end mode is an operation mode when the power of the EDS 10 is turned off. The standby mode is an operation mode in which the motor 11 is not driven and the drive instruction is waited for while the power is turned on. The abnormality mode is an operation mode after the EDS 10 is diagnosed as abnormal. The abnormality diagnosis mode is an operation mode for diagnosing the operation of the EDS 10, and is set when the user manually confirms the operation of the EDS 10 separately from the abnormality diagnosis process described later. These control modes are set according to a command from the integrated control unit 110, or are manually set by the user. Further, some of the operation modes may be set the same time. For example, when a temperature abnormality occurs, for example, when the temperature of the EDS 10 is equal to or higher than a threshold temperature, the abnormality mode and the power save mode can be set at the same time.

As shown in FIG. 2, the electric aircraft 20 is equipped with various components for controlling each EDS 10 or for performing an abnormality diagnosis of each EDS 10. Specifically, the electric aircraft 20 includes the flight control device 100, a sensor group 40, a user interface unit 50 (referred to as a "UI unit" 50), a communication device 60, and a power supply 70.

The flight control device 100 controls the electric aircraft 20 as a whole. The flight control device 100 is configured as a computer having a CPU, RAM, and ROM. The CPU of the flight control device 100 functions as the integrated control unit 110 and the abnormality diagnosis system 120 by executing a control program in the RAM. The control program is stored in advance in the ROM.

The integrated control unit 110 sets the mode of the driving force of the electric aircraft 20 according to the flight program or the maneuvering by the occupant. As the mode of the driving force of the electric aircraft 20, a first drive mode, a second drive mode, and a third drive mode are prepared in advance. The first drive mode is set such that the electric aircraft 20 is moved up and down in the vertical direction by driving the motor 11. The second drive mode is set such that the electric aircraft 20 is propelled in the horizontal direction by driving the motor 11. The third drive mode is set such that neither the ascending/descending nor the propulsion is realized. The mode of the driving force may be set individually, or the first and second drive modes may be set in combination.

As shown in FIG. 3, for example, in a flight program, when "takeoff and landing" is executed as an operation of the airframe, the moving direction of the airframe is the vertical direction. At this time, the integrated control unit 110 sets the first drive mode as the mode of the driving force of the electric aircraft 20. Further, at this time, the integrated control unit 110 instructs the EDS 10 corresponding to the levitation rotors 31a to 31g to drive the motor 11, and instructs the EDS 10 corresponding to the propulsion rotors 32a to 32b not to drive the motor 11. As a result, the motors 11 corresponding to the levitation rotors 31a to 31g (hereinafter, also referred to as "levitation motor") operate, and the motors 11 corresponding to the propulsion rotors 32a to 32b (hereinafter, "propulsion motor") are suspended.

Further, when "horizontal movement A" is executed as the operation of the aircraft, the moving direction of the aircraft is the vertical direction and the horizontal direction. At this time, the integrated control unit 110 sets the mode of the driving force of the electric aircraft 20 to the combination of the first drive mode and the second drive mode. The "horizontal movement A" includes an operation of moving horizontally and ascending, an operation of moving horizontally and maintaining an altitude, and an operation of moving horizontally and descending. For example, the "horizontal movement A" includes an operation of driving the levitation motor when the horizontal speed of the electric aircraft 20 is low, as buoyancy by driving the motor 11 is required to maintain the altitude. At this time, the integrated control unit 110 instructs all the EDS 10s corresponding to the levitation rotors 31a to 31g and the propulsion rotors 32a to 32b to drive the motor 11. As a result, both the levitation motor and the propulsion motor will operate.

Further, the "horizontal movement B" as the operation of the airframe is different from the horizontal movement A only in that the levitation motor is stopped. That is, the integrated control unit 110 sets the mode of the driving force of the electric aircraft 20 to only the second drive mode. The "horizontal movement B" includes an operation of moving horizontally and ascending, an operation of moving horizontally and maintaining an altitude, and an operation of moving horizontally and descending, as in the case of horizontal movement A. For example, the "horizontal movement B" includes an operation of moving horizontally without the need for buoyancy driven by the motor 11, since the speed of the electric aircraft 20 is high, an operation of gliding, or an operation of moving horizontally while naturally descending without maintaining the altitude, During such an operation, the integrated control unit 110 instructs the EDS 10 corresponding to the levitation rotors 31a to 31g not to drive the motor 11, and instructs the EDS 10 corresponding to the propulsion rotors 32a to 32b to drive the motor 11. As a result, the levitation motor is suspended and the propulsion motor is activated.

Further, when performing "hovering" as the operation of the aircraft, there is no moving direction of the aircraft. At this time, the integrated control unit 110 sets the mode of the driving force of the electric aircraft 20 to only the first drive mode as in the case of takeoff and landing. Specifically, the integrated control unit 110 instructs the EDS 10 corresponding to the levitation rotors 31a to 31g to drive the motor 11, and instructs the EDS 10 corresponding to the propulsion rotors 32a to 32b not to drive the motor 11. As a result, the levitation motor operates and the propulsion motor stops.

When executing "ground standby" as the operation of the aircraft, there is no moving direction of the aircraft. At this time, the integrated control unit 110 sets the mode of the driving force of the electric aircraft 20 to the third drive mode, and instructs all EDSs 10 not to drive the motor 11. As a result, both the levitation motor and the propulsion motor are suspended.

The command transmitted from the integrated control unit 110 to each EDS 10 includes the target torque and the target rotation speed of the motor 11 as command values. In each EDS 10, when the control unit 13 receives the command value from the integrated control unit 110, the control unit 13 sets the control mode of the EDS 10 and outputs a control signal to the inverter circuit 12 such that the output torque and the rotation speed of the motor 11 approach the target torque and the target rotation speed respectively. At this time, the control unit 13 controls the inverter circuit 12 by performing feedback control using the detection values of the sensors 14, 15, 16 and the torque sensor (not shown).

The abnormality diagnosis system 120 diagnoses whether each EDS 10 is abnormal or normal (hereinafter, referred to as "abnormal diagnosis") by executing an abnormality diagnosis process described later. The abnormality diagnosis system 120 functions as an information acquisition unit 121, an output state determination unit 122, a diagnosis execution unit 123, and a scheduled restart time specification unit 124. The information acquisition unit 121 acquires a motor output information which means information related to the output of the motor 11. In this embodiment, the motor output information means the mode of the driving force of the electric aircraft 20. As described above, since the mode of the driving force of the electric aircraft 20 (first to third drive modes) correlates with the output of the motor 11, such mode can be said to be information related to the output of the motor 11. The output state determination unit 122 determines whether the output state of each motor 11 is a low output state. In the present embodiment, the "low output state" means a state in which the output of the motor 11 does not contribute to the movement of the electric aircraft 20 such as raising, lowering and propulsion. Therefore, for example, the "low output state" is not limited to a case where the output (torque and rotation speed) of the motor 11 is zero, but may be larger than zero. The diagnosis execution unit 123 determines whether each EDS 10 is abnormal or normal by executing the diagnosis process described later. The scheduled restart time specification unit 124 specifies a timing when the motor 11 in the low output state is expected to be changed into not the low output state. That is, the scheduled restart time specification unit 124 specifies a scheduled time to start the output contributing to the movement of the electric aircraft 20 (scheduled restart time). Details of the method for specifying the scheduled restart time will be described later.

The sensor group 40 includes an altitude sensor 41, a location sensor 42, a velocity sensor 43, and a posture sensor 44. The altitude sensor 41 detects the current altitude of the electric aircraft 20. The location sensor 42 identifies the current position of the electric aircraft 20 as latitude and longitude. In the present embodiment, the location sensor 42 is configured by GNSS (Global Navigation Satellite System). As the GNSS, for example, GPS (Global Positioning System) may be used. The velocity sensor 43 detects the speed of the electric aircraft 20. The posture sensor 44 detects the posture of the airframe 21. In the present embodiment, the posture sensor 44 includes plural acceleration sensors configured by a three-axis sensor, and specifies the posture of the airframe 21 in the tilt direction and the roll direction.

The UI unit 50 supplies the occupant of the electric aircraft 20 with a user interface for controlling the electric aircraft 20 and monitoring the operating state. The user interface includes, for example, an operation input unit such as a keyboard and a button, a display unit such as a liquid crystal panel, and the like. The UI unit 50 is provided, for example, in the cockpit of the electric aircraft 20. The occupant can change the operation mode of the electric aircraft 20 and execute the operation test of each EDS 10 by using the UI unit 50.

The communication device 60 communicates with another electric aircraft, a control tower on the ground, and the like. The communication device 60 corresponds to, for example, a civilian VHF radio. The communication device 60 may be configured to communicate through a wireless LAN specified in IEEE802.11 or a wired LAN specified in IEEE802.3, in addition to the civilian VHF. The power source 70 is composed of a lithium ion battery and functions as one of the power supply sources in the electric aircraft 20. The power supply 70 supplies three-phase AC power to the motor 11 via the inverter circuit 12 of each EDS 10. The power source 70 may be an arbitrary secondary battery such as a nickel hydrogen battery instead of the lithium ion battery, and may be configured by any power supply source such as fuel cell or power generator, replaced with the secondary battery or in addition to the secondary battery.

Figure 4:
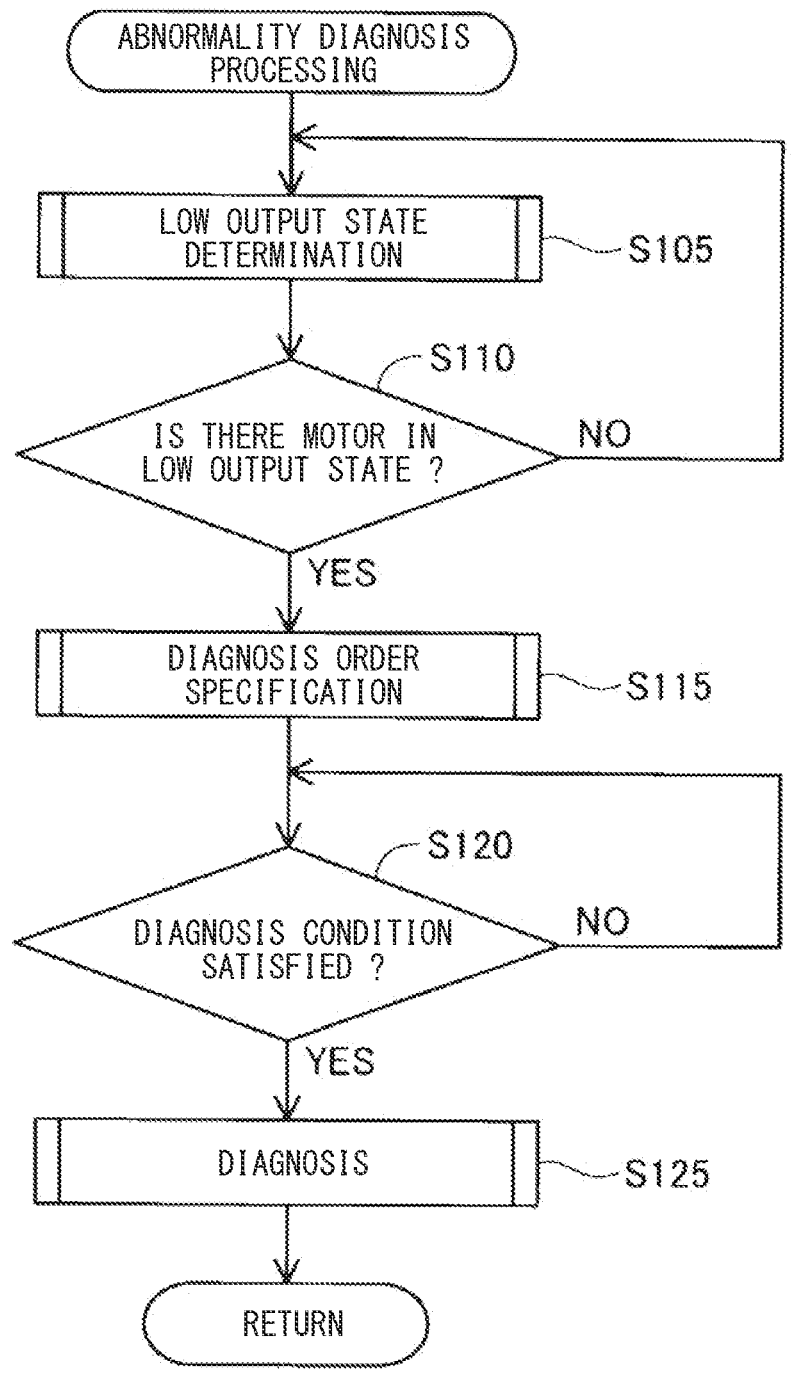
FIG. 4 is a flowchart showing a procedure of abnormality diagnosis processing in a first embodiment.

A2. Abnormality Diagnosis Processing:

The abnormality diagnosis processing shown in FIG. 4 determines whether each EDS 10 is abnormal or normal. The abnormality diagnosis system 120 executes the abnormality diagnosis processing when the power of the flight control device 100 is turned on.

Figure 5:
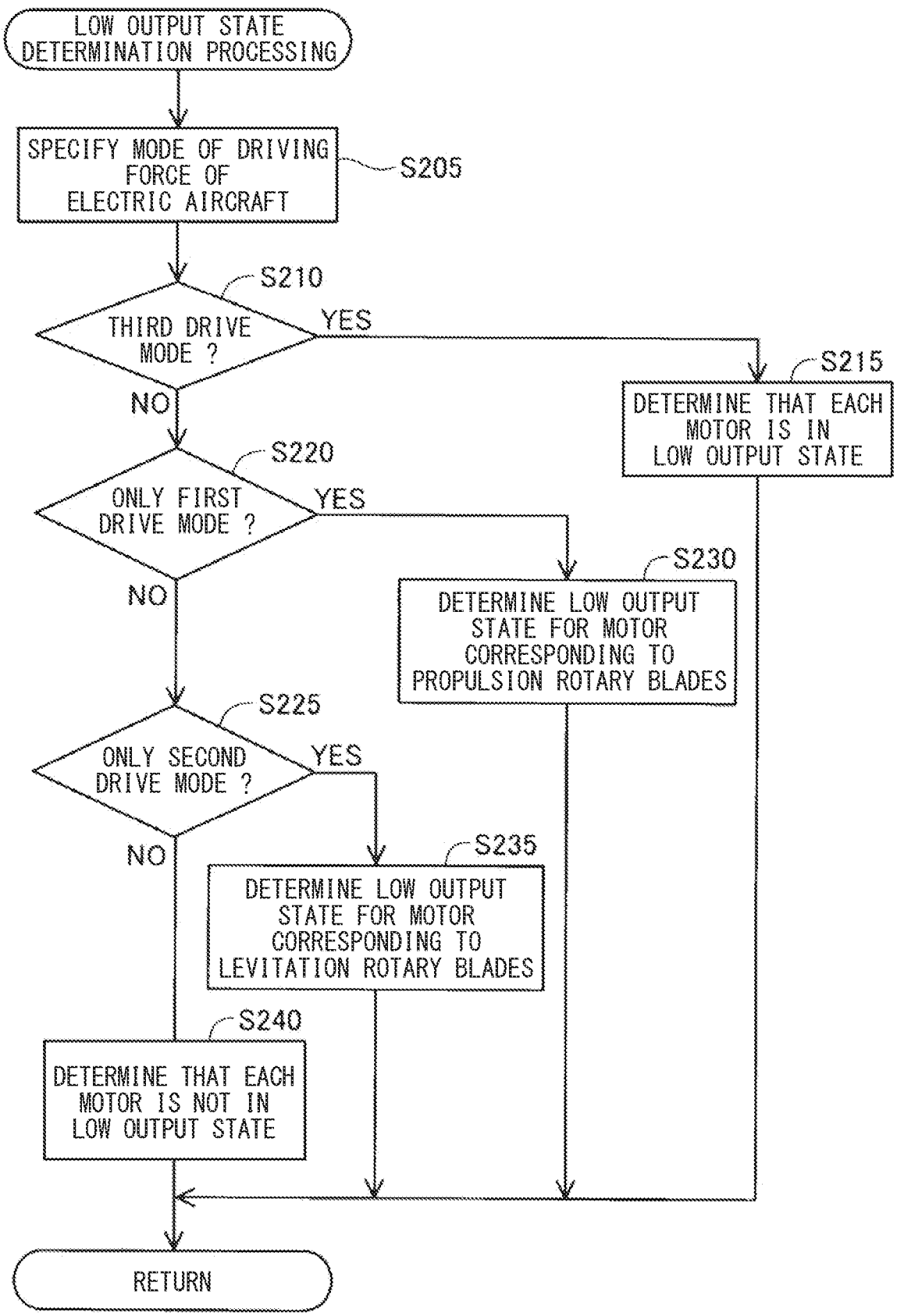
FIG. 5 is a flowchart showing a procedure of low output state processing in the first embodiment.

The information acquisition unit 121 and the output state determination unit 122 execute a determination (hereinafter, referred to as "low output state determination") as to whether each EDS 10 is in a low output state (step S105). As shown in FIG. 5, the information acquisition unit 121 specifies the mode of the driving force of the electric aircraft 20 (step S205). As described above, in the present embodiment, the motor output information is the operation mode of the electric aircraft 20. The information acquisition unit 121 acquires the mode of the driving force of the electric aircraft 20 by inquiring to the integrated control unit 110.

The output state determination unit 122 determines whether the specified mode is the third drive mode, that is, whether there is no raising, no lowering and no propulsion of the electric aircraft 20 (step S210). When it is determined that the third drive mode is used (step S210: YES), the output state determination unit 122 determines that each motor 11 is in a low output state (step S215), because each motor 11 is inactive when the operation mode of the electric aircraft 20 is the third drive mode.

When it is determined that the mode is not the third drive mode (step S210: NO), the output state determination unit 122 determines whether the mode of the driving force of the electric aircraft 20 is only the first drive mode (step S220).

When it is determined that the mode of the driving force of the electric aircraft 20 is the first drive mode (step S220: YES), the output state determination unit 122 determines that the motor 11 corresponding to the propulsion rotor 32*a*, 32*b* is in the low output state (step S230). As described above with reference to FIG. 3, in the case of only the first drive mode, the operation of the aircraft is "takeoff and landing", and the propulsion rotor 32*a*. 32*b* is not driven, such that the output does not contribute to the movement (elevation) of the electric aircraft 20. Therefore, in this embodiment, in this case, it is determined that the motor 11 (propulsion motor) corresponding to the propulsion rotor 32*a*, 32*b* is in the low output state.

When it is determined that the mode of the driving force of the electric aircraft 20 is not only the first drive mode (step S220: NO), the output state determination unit 122 determines whether the mode of the driving force of the electric aircraft 20 is only the second drive mode (step S225).

When it is determined that the mode of the driving force of the electric aircraft 20 is only the second drive mode (step S225: YES), the output state determination unit 122 determines that the motor 11 corresponding to the levitation rotor 31*a* to 31*g* is in the low output state (step S235). As described above with reference to FIG. 3, in the case of only the second drive mode, that is, the operation of the aircraft is "horizontal movement B", and the levitation rotor 31*a* to 31*g* is not driven, such that the output does not contribute to the movement (horizontal propulsion) of the electric aircraft 20. Therefore, in this embodiment, in this case, the motor 11 (levitation motor) corresponding to the levitation rotor 31*a* to 31*g* is determined to be in the low output state.

When it is determined that the mode of the driving force of the electric aircraft 20 is not only the second drive mode (step S225: NO), the output state determination unit 122 determines that each motor 11 is not in the low output state (step S240). In this case, the operation of the airframe is the "horizontal movement A" shown in FIG. 3, and all the rotors 31 are driven. Therefore, in this case, it is determined that none of the motors 11 is in the low output state. After the completion of steps S215, S230, S235 and S240 described above, step S110 shown in FIG. 4 is executed.

As a result of step S105, the diagnosis execution unit 123 determines whether there is a motor 11 in the low output state (step S110), If it is determined that there is no motor 11 in the low output state (step S110: NO), the process returns to step S105, When it is determined that there is a motor 11 in the low output state (step S110: YES), the diagnosis execution unit 123 executes a diagnosis order specification process (step S115). The diagnosis order specification process means a process of specifying the order in which an abnormality diagnosis is performed.

Figure 6:
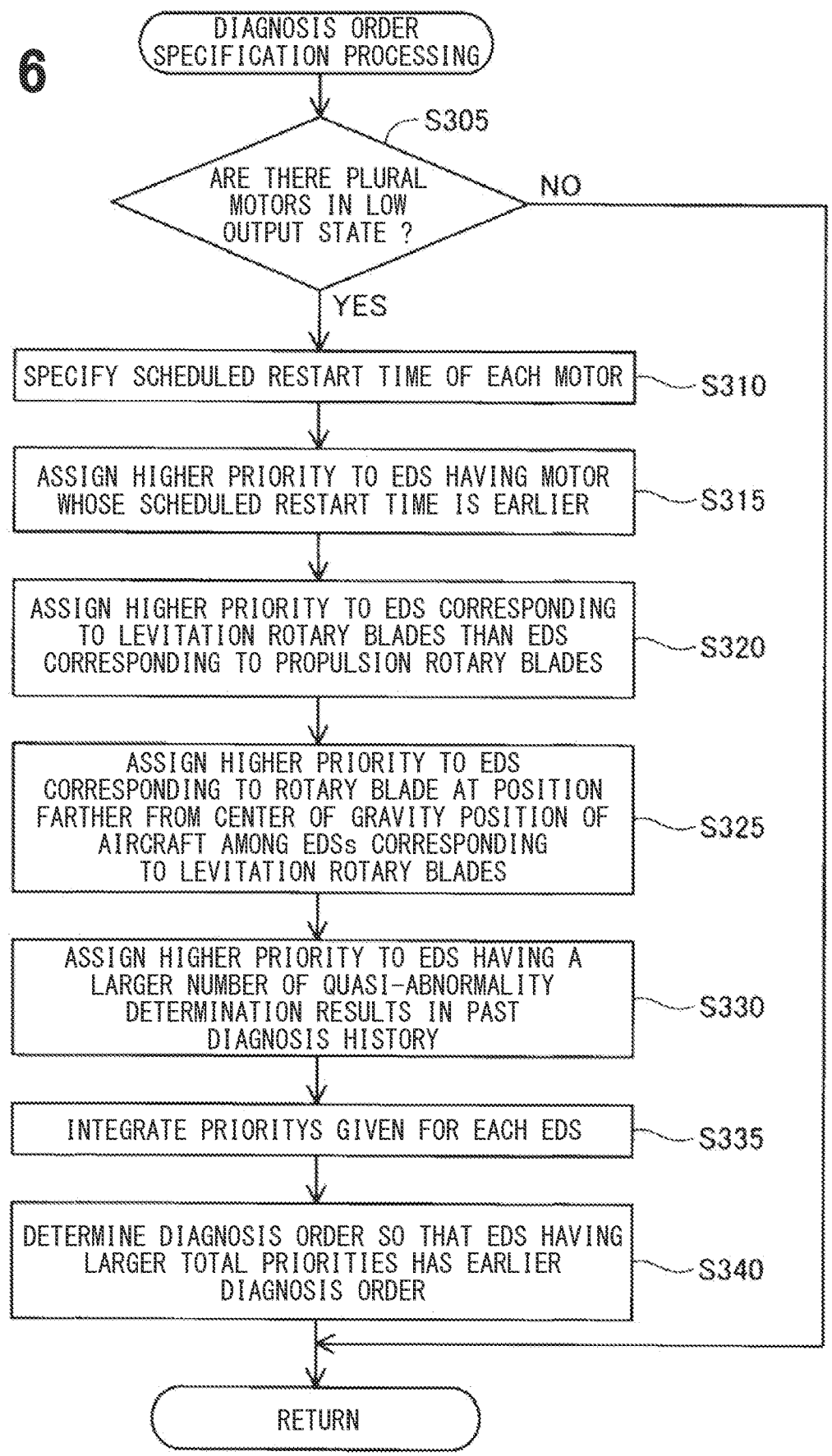
FIG. 6 is a flowchart showing a procedure of a diagnosis order specification processing in the first embodiment.

As shown in FIG. 6, the diagnosis execution unit 123 determines whether there are plural motors 11 in the low output state (step S305). When it is determined that there are not the plural motors 11 in the low output state (step S305: NO), only the corresponding single motor 11 is the diagnosis target, so that the diagnosis order specification process is completed without determining the diagnosis order.

When it is determined that there are plural motors 11 in the low output state (step S305: YES), the scheduled restart time specification unit 124 specifies the scheduled restart time of each motor 11 in the low output state (step S310). In the present embodiment, the scheduled restart time specification unit 124 specifies the restart time based on a preset flight program. For example, when the electric aircraft 20 is propelling in the horizontal direction and the motor 11 for the levitation rotor 30a to 30e is in the low output state, the scheduled restart time specification unit 124 specifies a scheduled time at which the electric aircraft 20 next performs an ascending or descending operation based on the flight program. The scheduled time is specified as the scheduled restart time of the levitation rotors 30a to 30e. Further, for example, even when the electric aircraft 20 is in the start mode and it is determined that all the motors 11 are in the low output state, the scheduled time for the electric aircraft 20 to perform the ascending operation is specified based on the flight program, and the scheduled time is specified as the scheduled restart time of the levitation rotors 30a to 30e.

The diagnosis execution unit 123 assigns a larger priority value to the EDS 10 having the motor 11 whose scheduled restart time is earlier (step S315). This is to increase the possibility of finding an abnormality before the restart by performing the abnormality diagnosis earlier for the EDS 10 which is scheduled to be restarted earlier. This is also to complete the abnormality diagnosis at the time of restart. The priority values given in this step S315 and steps S320 to S330 described later are set as values independent of each other.

The diagnosis execution unit 123 assigns a higher priority value to the EDS 10 corresponding to the levitation rotors 31a to 31g than the EDS 10 corresponding to the propulsion rotors 32a to 32b (step S320). For example, if all the motors 11 are determined to be in the low output state and all the motors 11 are scheduled to be restarted in the near future from the flight program, the higher priority value is assigned to the EDS 10 corresponding to the levitation rotors 31a to 31g than the EDS 10 corresponding to the propulsion rotor 32a to 32b. Even if an abnormality occurs in the EDS 10 corresponding to the propulsion rotors 32a to 32b during the flight of the electric aircraft 20, it is not directly linked to the fall of the electric aircraft 20, whereas the falling possibility of the electric aircraft 20 increases if an abnormality occurs in the EDS 10 corresponding to the levitation rotors 31 to 31g. Therefore, the influence caused by the abnormality in the EDS 10 corresponding to the levitation rotors 31a to 31g is larger than the influence caused by the abnormality in the EDS 10 corresponding to the propulsion rotors 32a to 32b. Therefore, in the present embodiment, the abnormality diagnosis is performed earlier for the EDS 10 corresponding to the levitation rotors 31a to 31g than the EDS 10 corresponding to the propulsion rotors 32a to 32b. Thus, the possibility of finding an abnormality in the EDS 10 corresponding to the large levitation rotors 31a to 31g before restarting is increased, since the influence at the time of abnormality is larger.

The diagnosis execution unit 123 assigns a larger priority value to the EDS 10 corresponding to the rotor 30 at a position farther from the center of gravity CM, among the EDS 10 corresponding to the levitation rotors 31a to 31g (step S325), For example, when it is determined that the levitation rotor 31b and the levitation rotor 31f shown in FIG. 1 are in the low output state, a larger priority value is given to the EDS 10 corresponding to the levitation rotor 31f farther from the center of gravity CM than the EDS 10 corresponding to the levitation rotor 31b. The abnormality in the rotor 30 (levitation rotor) farther from the center of gravity CM has a greater influence on the stability in the posture and flight state of the electric aircraft 20 than the abnormality in the rotor 30 (levitation rotor) closer to the center of gravity CM has. Therefore, in the present embodiment, the possibility of finding an abnormality before restarting is raised by performing an abnormality diagnosis earlier for the EDS 10 corresponding to the rotor 30 (levitation rotor) farther from the center of gravity CM.

As shown in FIG. 6, the diagnosis execution unit 123 assigns a larger priority value to the EDS 10 having a larger number of quasi-abnormality determination results in the past diagnosis history (step S330). The "quasi-abnormality" means a state close to an abnormal state among normal states, even if it is not diagnosed as abnormal. If the number of times it is determined to be quasi-abnormal is large, there is a high possibility that an abnormal state will occur thereafter. Therefore, the possibility of finding an abnormality before restarting is increased by targeting the EDS 10 that is likely to be in such an abnormal state and performing an abnormality diagnosis earlier.

The diagnosis execution unit 123 integrates the priority values given in steps S315 to S330 for each EDS 10 to calculate the total priority value (step S335). The diagnosis execution unit 123 determines the diagnosis order so that the EDS 10 having the larger total priority value calculated in step S335 has an earlier diagnosis order (step S340). For the EDS 10 having the same total integrated value, the diagnostic order may be determined according to a predetermined order. Step S120 shown in FIG. 4 is executed after the completion of step S340.

As shown in FIG. 4, the diagnosis execution unit 123 determines whether the diagnosis condition is satisfied (step S120). The "diagnosis condition" is a precondition for performing an abnormality diagnosis. In the present embodiment, the diagnostic condition is satisfied when "the amount of electric power stored in the power supply 70 is equal to or greater than a predetermined value". In the abnormality diagnosis, electric power that does not contribute to the movement of the electric aircraft 20 is consumed. Therefore, in the present embodiment, when the amount of electric power stored in the power source 70 is less than the predetermined value, the abnormality diagnosis is not performed so as not to affect the movement of the electric aircraft 20. The flight control device 100 receives the SOC (State Of Charge) value of the power supply 70 from an ECU (not shown) that detects the SOC of the power supply 70, Then, the diagnosis execution unit 123 determines whether the diagnosis condition is satisfied based on the received SOC value. If the diagnostic condition is not satisfied (step S120: NO), step S120 is executed again. That is, the process waits until the diagnosis condition is satisfied.

When it is determined that the diagnosis condition is satisfied (step S120: YES), the diagnosis execution unit 123 executes the diagnosis process (step S125). At this time, the diagnosis execution unit 123 executes the diagnosis process for the diagnosis target EDS 10 (hereinafter, also referred to as "diagnosis target EDS 10") in the order specified in step S115.

Figure 7:
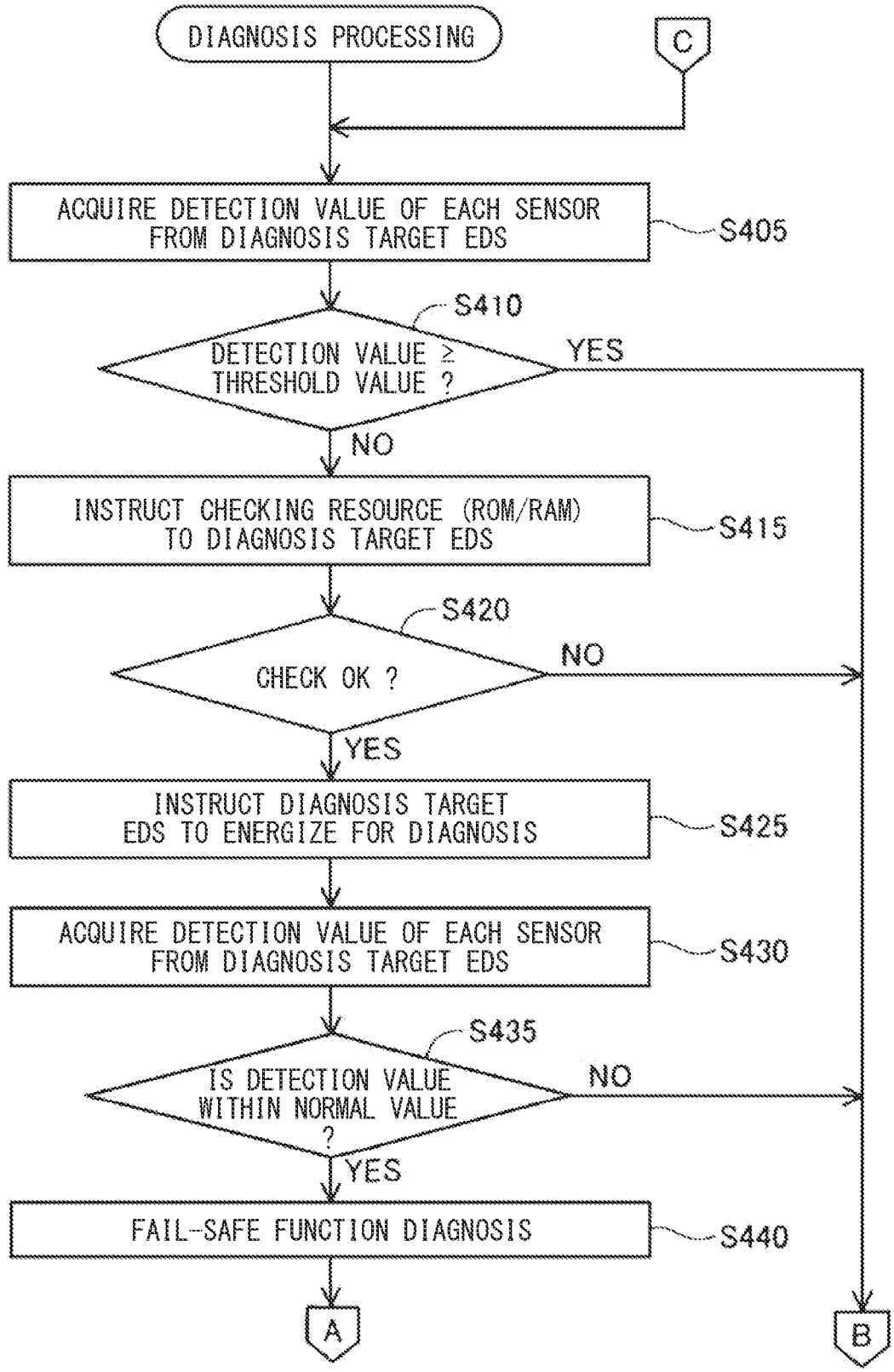
FIG. 7 is a flowchart showing a procedure of diagnostic processing in the first embodiment.
Figure 8:
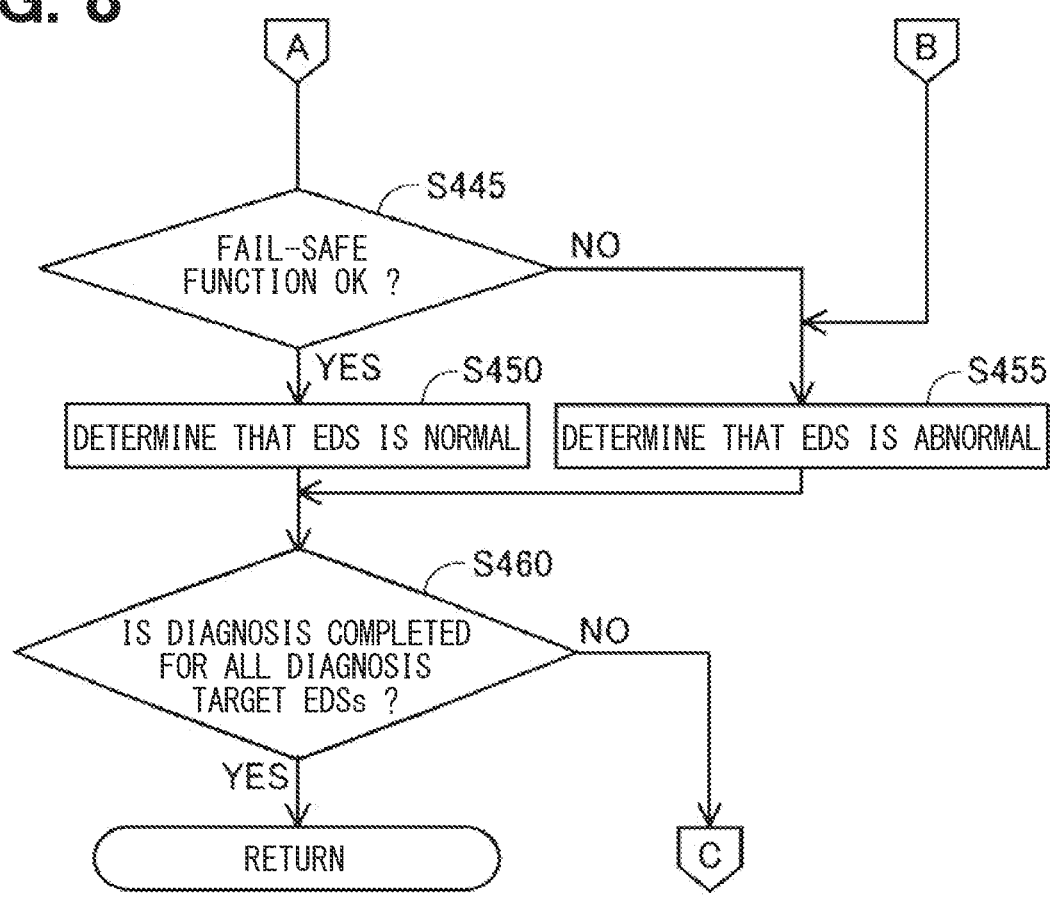
FIG. 8 is a flowchart showing a procedure of diagnostic processing in the first embodiment.

As shown in FIG. 7, the diagnosis execution unit 123 acquires the detection values of the sensors 14 to 16 from the diagnosis target EDS 10 (step S405). The diagnosis execution unit 123 determines whether each detection value is equal to or higher than a predetermined threshold value (step S410). When it is determined that any one of the detected values is equal to or greater than the threshold value (step S410: YES), the diagnosis execution unit 123 determines that the corresponding EDS 10 is abnormal (step S455), as shown in FIG. 8. Since the motor 11 is in the low output state in the EDS 10 to be diagnosed, each sensor value will be a low value in a normal state in which no abnormality has occurred in the sensors 14 to 16, the control unit 13, and the storage device 17. In this way, the values of the sensors 14 to 16 in the normal state are specified by experiments, simulations, or the like, and a value larger than the specified value may be preset as the threshold value in step S410.

As shown in FIG. 7, when it is determined that all the detected values of the sensors 14 to 16 are not equal to or greater than the threshold value (less than the threshold value) (step S410: NO), the diagnosis execution unit 123 instructs a check of resources such as ROM and RAM of the microcomputer constituting the control unit 13, relative to the diagnosis target EDS 10 (step S415). The check includes, for example, a normality checking in write/read using a checksum. Since such a check is performed with a high processing load, the check is executed when the motor 11 is in the low output state and the processing load other than the abnormal processing in the control unit 13 is low. The diagnosis execution unit 123 determines whether the result of the check in step S415 is OK (step S420). When it is determined that the check result is not OK (step S420: NO), step S455 is executed as shown in FIG. 8, and the corresponding EDS 10 is determined to be abnormal.

When it is determined that the check result is OK (step S420: YES), the diagnosis execution unit 123 instructs the diagnosis target EDS 10 to energize for diagnosis (step S425), Upon receiving such an instruction, the control unit 13 energizes the motor 11 for diagnosis via the inverter circuit 12 in the diagnosis target EDS 10. Energization for diagnosis means energization to the motor 11 for abnormality diagnosis. In the present embodiment, the control unit 13 supplies the motor 11 with a current having a predetermined magnitude that can suppress the influence on the torque of the motor 11 as a diagnostic energization. Specifically, a current having a predetermined magnitude, which mainly consists of a d-axis current that does not affect torque and has a q-axis current of a predetermined value or less, is supplied to the motor 11 as a diagnostic energization. A high frequency pattern current may be supplied as the diagnostic energization.

The diagnosis execution unit 123 acquires the detection values of the sensors 14 to 16 from the diagnosis target EDS 10 (step S430). The detection value obtained at this time corresponds to the detection value of each of the sensors 14 to 16 in the situation where the motor 11 is energized for diagnosis. The diagnosis execution unit 123 determines whether the detection value obtained in step S430 is within a normal value (step S435). In the present embodiment, the range of the detection values of the sensors 14 to 16 obtained when the diagnostic energization is performed in the normal state is specified in advance by experiments or the like. The diagnosis execution unit 123 determines that the value is a normal value when the detection value obtained in step S430 is within the range, and determines that the value is not the normal value if the value is outside the range. When the diagnostic energization is performed, the current value and the voltage value are detected as relatively low values under normal conditions. Further, when the diagnostic energization is performed, the motor 11 does not rotate, so that the rotation speed is zero.

If it is determined that the detection value is not a normal value (step S435: NO), step S455 is executed. When it is determined that the detection value is within the normal value (step S435: YES), the diagnosis execution unit 123 executes the fail-safe function diagnosis (step S440). The fail-safe function diagnosis diagnoses the normality in the fail-safe function. In the present embodiment, the fail-safe function suppresses the rotation of the motor 11 by supplying no current to the motor 11 when an abnormality occurs in the terminal voltage (power supply voltage) of the power supply 70 or an on/off failure in the inverter circuit 12. An abnormality in the terminal voltage of the power supply 70 can be detected as an abnormality in the voltage supplied to the inverter circuit 12. Further, when an on off failure occurs in the inverter circuit 12, it can be detected as an abnormality in the phase current. The control unit 13 detects the presence or absence of the abnormalities, and controls the inverter circuit 12 so as to stop the supply current to the motor 11 to realize a fail-safe function when the abnormality is detected. Then, in step S440, the diagnosis execution unit 123 creates a pseudo abnormal state by outputting a false abnormal signal, for example, a signal including an abnormal voltage value or an abnormal current value to the control unit 13. The normality of the fail-safe function can be diagnosed by specifying whether the supply current to the motor 11 is stopped in such an abnormal state. The circuit configuration for outputting a false abnormal signal and a specific diagnostic method may be obtained from a known configuration such as JP 2018-26953 A which is incorporated herein by reference.

As shown in FIG. 8, the diagnosis execution unit 123 determines whether the fail-safe function is OK as a result of the fail-safe function diagnosis (step S445). If it is determined that the fail-safe function is not OK (step S445: NO), step S455 is executed, and the corresponding EDS 10 is determined to be abnormal. When it is determined that the fail-safe function is OK (step S445: YES), it is determined that the corresponding EDS 10 is normal (step S450).

After the completion of step S450 or step S455, the diagnosis execution unit 123 determines whether the diagnosis is completed for all the diagnosis target EDSs 10, that is, all the EDSs 10 determined to be in the low output state (step S460). When it is determined that the diagnosis has not been completed for all the diagnosis target EDS 10 (step S460: NO), the process returns to step S405. Then, in this case, the diagnosis is executed for the next-order EDS 10. When it is determined that the diagnosis is completed for all the diagnosis target EDS 10 (step S460: YES), the process returns to step S105 as shown in FIG. 4.

The determination results of steps S450 and S455 are recorded as a history in the flight control device 100. Further, in the present embodiment, the determination result is displayed in the UI unit 50. Therefore, the user can confirm whether each EDS 10 is abnormal by using the UI unit 50. Further, a process for recovery may be automatically performed for the EDS 10 determined to be abnormal, if it is possible to recover to the normal state. For example, in step S410 shown in FIG. 7, when the detected value is equal to or greater than the threshold value, the offset (zero point) adjustment of the sensor may be automatically executed. Further, in the EDS 10 in which the detected value is determined not to be a normal value in step S435, the adjustment of the sensor gain may be automatically executed.

According to the abnormality diagnosis system 120 of the first embodiment, when it is determined that the output state of the motor 11 is a low output state that does not contribute to the movement of the electric aircraft 20, the abnormality diagnosis of the EDS 10 is performed. Thus, it is possible to perform an abnormality diagnosis of the EDS 10 while suppressing the influence on the moving operation of the aircraft 20.

Further, since the abnormality diagnosis is performed on the EDS 10 that drives the motor 11 determined to be in the low output state, among the motors 11, the abnormality diagnosis is not performed for the motor determined not to be in the low output state. Therefore, it is possible to suppress the influence caused by conducting the unnecessary abnormality diagnosis, such that the influence on the moving operation of the electric aircraft 20 can be further suppressed.

Further, when the mode of the driving force of the electric aircraft 20 is the third drive mode that does not realize the vertical ascending/descending and horizontal propulsion of the electric aircraft 20, it is determined that each motor 11 is in a low output state. Therefore, the abnormality diagnosis can be performed in such a third drive mode. Therefore, it is possible to restrict the abnormality diagnosis from affecting the vertical ascending/descending and horizontal propulsion of the electric aircraft 20.

Further, when the mode of the driving force of the electric aircraft 20 is only the first drive mode for realizing the ascending/descending, it is determined that the output state of the motor 11 corresponding to the propulsion rotors 32a to 32b is the low output state. Therefore, the abnormality diagnosis can be performed on the EDS 10 that drives the motor 11 in the low output state, and it is possible to suppress that the abnormality diagnosis from affecting the ascending/descending operation of the electric aircraft 20. Further, when the mode of the driving force of the electric aircraft 20 is only the second drive mode that realizes the horizontal propulsion, it is determined that the output state of the motor 11 corresponding to the levitation rotors 31a to 31g is the low output state. Therefore, it is possible to perform an abnormality diagnosis on the EDS 10 that drives the motor 11 in the low output state, and it is possible to suppress the abnormality diagnosis from affecting the horizontal propulsion of the electric aircraft 20.

Further, the diagnosis execution unit 123 determines the execution order of the abnormality diagnosis based on the scheduled restart time of the motor 11, the magnitude of the influence caused by the abnormality in the EDS 10 for driving the motor 11, and the history of abnormality diagnosis for the EDS 10 for driving the motor 11. Since the abnormality diagnosis can be performed earlier for the EDS 10 for which an earlier abnormality diagnosis is required, the execution order of the abnormality diagnosis can be appropriately determined.

Further, the diagnosis execution unit 123 performs an abnormality diagnosis earlier for the EDS 10 that drives the motor 11 with an earlier scheduled restart time than the EDS 10 that drives the motor 11 with a later scheduled restart time. Thus, it is possible to suppress the influence on the moving operation of the electric aircraft 20 at the time of restarting.

Further, since the diagnosis execution unit 123 performs the abnormality diagnosis earlier for the EDS 10 corresponding to the levitation rotors 31a to 31g than the EDS 10 corresponding to the propulsion rotors 32a to 32b, it is possible to suppress the influence on the ascending/descending motion of the aircraft 20.

Further, the abnormality diagnosis is performed earlier for the EDS 10 corresponding to the levitation rotor at a position where the distance from the center of gravity CM of the electric aircraft 20 is relatively long than the EDS 10 corresponding to the levitation rotor at a position where the distance from the center of gravity CM is relatively short. Therefore, it is possible to perform an abnormality diagnosis earlier for the EDS 10 which has a greater influence on the electric aircraft 20, since the levitation rotor is placed at a position where the distance from the center of gravity CM is relatively long. Thus, it is possible to further suppress the influence of the abnormality diagnosis on the ascending/descending operation of the electric aircraft 20.

Further, the diagnosis execution unit 123 performs the abnormality diagnosis for the EDS 10 subject to the abnormality diagnosis by energizing the motor 11 so that the output of the motor 11 does not contribute to the movement of the electric aircraft 20. Therefore, it is possible to perform an abnormality diagnosis on the premise that the motor 11 is energized not to affect the moving operation of the electric aircraft 20.

B. Second Embodiment

Since the configuration of the electric aircraft 20 of the second embodiment is the same as the configuration of the electric aircraft 20 of the first embodiment, the same components are designated by the same reference numerals, and detailed description thereof will be omitted. The abnormality diagnosis process of the second embodiment is different from the first embodiment in the detailed procedure of the low output state determination process, and the other procedures are the same as those of the first embodiment.

Figure 9:
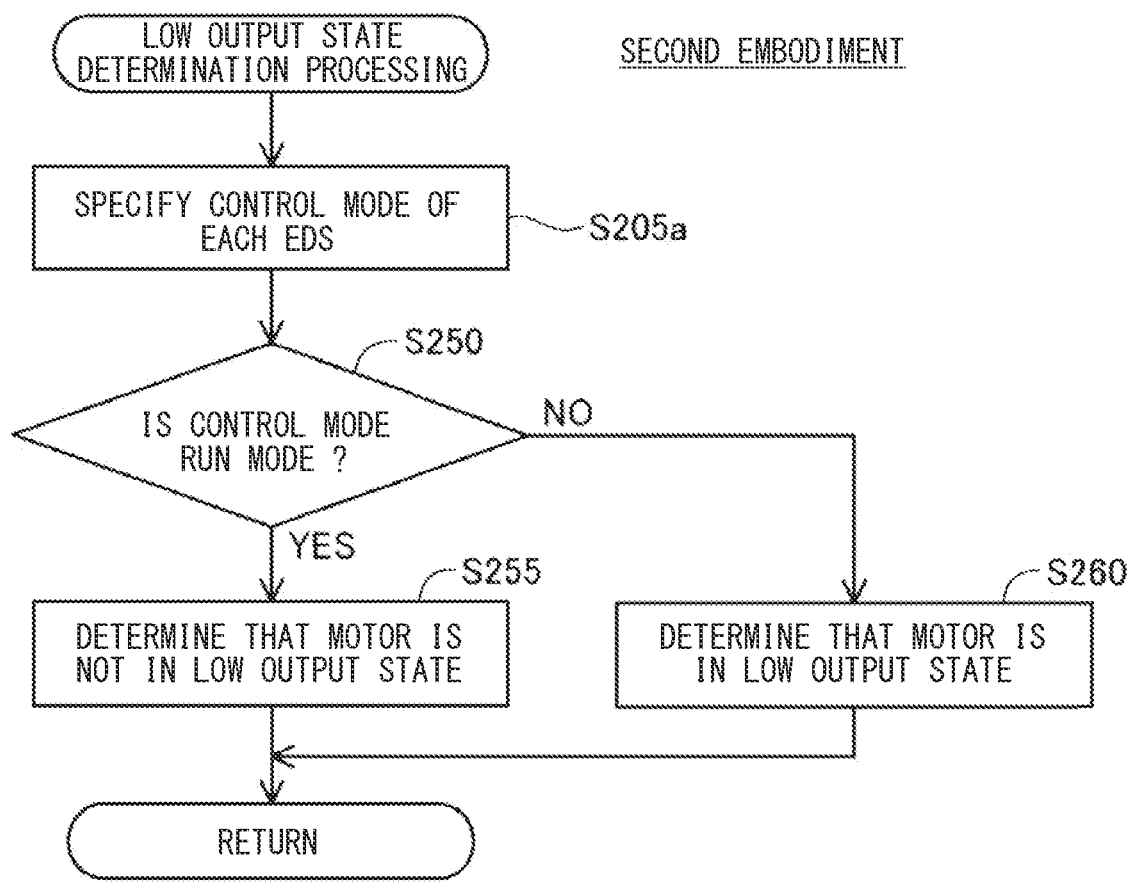
FIG. 9 is a flowchart showing a procedure of low output state processing in a second embodiment.

As shown in FIG. 9, in the low output state determination process of the second embodiment, unlike the first embodiment, the information acquisition unit 121 acquires and specifies the control mode of each EDS 10 (step S205a). For example, the information acquisition unit 121 specifies the control mode by inquiring to each EDS 10. The output state determination unit 122 determines whether the specified control mode is the RUN mode (step S250). When it is determined that the EDS 10 is in the RUN mode (step S250: YES), the output state determination unit 122 determines that the corresponding motor 11 is not in the low output state (step S255). When it is determined that the EDS 10 is not in the RUN mode (step S250: NO), the output state determination unit 122 determines that the corresponding motor 11 is in the low output state (step S260). In the second embodiment, the control mode of the EDS 10 corresponds to the motor output information of the present disclosure.

The abnormality diagnosis system 120 of the second embodiment has the same effect as the abnormality diagnosis system 120 of the first embodiment. In addition, since the low output state determination process can be performed by a simple process, the time required for the processing can be shortened and the processing load can be reduced.

C. Third Embodiment

Since the configuration of the electric aircraft 20 of the third embodiment is the same as the configuration of the electric aircraft 20 of the first embodiment, the same components are designated by the same reference numerals, and detailed description thereof will be omitted. The abnormality diagnosis process of the third embodiment is different from the first embodiment in the detailed procedure of the low output state determination process, and the other procedures are the same as those of the first embodiment.

As shown in FIG. 10, in the low output state determination process of the third embodiment, the information acquisition unit 121 acquires the instructed output value transmitted from the integrated control unit 110 to each EDS 10, and the output state determination unit 122 determines whether the instructed output value is equal to or less than the threshold value (step S505). The threshold value in step S505 is set to the maximum value of the instructed value when the motor 11 is driven so that the output state of the motor 11 becomes the low output state. The threshold value is specified in advance by experiments as a command value for the control unit 13 to control the motor 11 so that the output of the motor 11 is in a low output state where the output of the motor 11 does not contribute to the movement such as raising, lowering and propulsion of the electric aircraft 20. Therefore, in step S505, the drive command transmitted from the integrated control unit 110 to each EDS 10 is acquired, and it is determined whether the acquired drive command causes the motor 11 to drive so that the output state of the motor 11 becomes a low output state.

When it is determined that the instructed output value is equal to or less than the threshold value (step S505: YES), the output state determination unit 122 determines that the corresponding EDS 10 is in a low output state (step S530). When it is determined that the instructed output value is not equal to or less than the threshold value (step S505: NO), the information acquisition unit 121 acquires the phase current value, the motor rotation speed, and the motor rotation angle from each EDS 10 (step S510). The output state determination unit 122 determines whether all the acquired phase current values are equal to or less than the threshold current value (step S515).

When it is determined that all the acquired phase currents are equal to or less than the threshold current (step S515: YES), step S530 is executed. When it is determined that at least one of the acquired phase currents is not equal to or less than the threshold current (step S515: NO), the output state determination unit 122 determines whether the acquired motor rotation speed is equal to or less than the threshold (step S520).

When it is determined that the acquired motor rotation speed is equal to or less than the threshold rotation speed (step S520: YES), step S530 is executed. When it is determined that the acquired motor rotation speed is not equal to or less than the threshold rotation speed (step S520: NO), the output state determination unit 122 determines whether the acquired rotation angle is held within a predetermined angle range for a predetermined time (step S525). In the present embodiment, each motor 11 is configured to stop at a predetermined rotation angle when transitioning from the RUN mode to the standby mode or the end mode, so as to stop the blade of the rotor 30 at a predetermined position. The predetermined angle range of step S525 may be set to include the rotation angle of the motor 11 when the blade stops at a predetermined position. When the rotation angle of the motor 11 is held within the predetermined angle range for a predetermined time, it is highly possible that the rotation of the motor 11 is stopped and the electric aircraft 20 is not moving. In the present embodiment, the predetermined time of step S525 is set to 5 seconds. The predetermined time is not limited to 5 seconds and may be set to any time period.

When it is determined that the rotation angle is held within the predetermined angle range for a predetermined time (step S525: YES), step S530 is executed. When it is determined that the rotation angle is not held within the predetermined angle range for a predetermined time (step S525: NO), the output state determination unit 122 determines that the corresponding EDS 10 is not in the low output state (step S535). After the completion of step S530 or step S535, the low output state determination process ends. In the third embodiment, the instructed output value to each EDS 10, the motor current value, the motor rotation speed, and the rotation angle correspond to the motor output information of the present disclosure.

The abnormality diagnosis system 120 of the third embodiment has the same effect as the abnormality diagnosis system 120 of the first embodiment. In addition, when the drive command transmitted from the integrated control unit 110 drives the motor 11 so that the output state becomes the low output state, it is determined that the motor 11 is in the low output state. It is possible to accurately determine whether the motor 11 is in the low output state.

D. Fourth Embodiment

Since the configuration of the electric aircraft 20 of the fourth embodiment is the same as the configuration of the electric aircraft 20 of the first embodiment, the same components are designated by the same reference numerals, and detailed description thereof will be omitted. The abnormality diagnosis process of the fourth embodiment is different from the first embodiment in the detailed procedure of the low output state determination process, and the other procedures are the same as those of the first embodiment.

As shown in FIG. 11, in the low output state determination process of the fourth embodiment, the information acquisition unit 121 acquires the detection value of the altitude sensor 41, and the output state determination unit 122 determines whether the current flight altitude of the electric aircraft 20 is equal to or higher than a predetermined threshold altitude based on the acquired detection value (step S605), When it is determined that the flight altitude is equal to or higher than the predetermined threshold altitude (step S605: YES), the output state determination unit 122 determines that the motor 11 corresponding to the levitation rotors 31a to 31g is in a low output state (step S615). The threshold altitude of step S615 is preset as an altitude slightly lower than the altitude at which the electric aircraft 20 normally flies. When the electric aircraft 20 has reached the threshold altitude or higher, it is no longer necessary to raise the electric aircraft 20, and it is highly possible that the levitation rotors 31a to 31g are stopped. Therefore, in this embodiment, in this case, it is determined that the motor 11 corresponding to the levitation rotors 31a to 31g is in a low output state.

When it is determined that the flight altitude is not equal to or higher than the predetermined threshold altitude (step S605: NO), the information acquisition unit 121 acquires the detected value of the velocity sensor 43, and the output state determination unit 122 determines whether the velocity of the electric aircraft 20 in the height direction (vertical direction) is equal to or less than a first threshold velocity (magnitude) based on the acquired detected value (step S610), \Mien it is determined that the magnitude of the velocity in the height direction is equal to or less than the first threshold velocity (step S610: YES), step S615 is executed, and it is determined that the motor 11 corresponding to the levitation rotors 31a to 31g is in the low output state. The first threshold speed in step S610 is specified and set in advance by experiments as the speed at which the electric aircraft 20 ascends in the vertical direction. When the magnitude of the speed in the height direction (vertical direction) of the electric aircraft 20 is equal to or less than the first threshold speed, it is highly possible that the electric aircraft 20 is no longer ascending. Therefore, in this embodiment, in this case, it is determined that the motor 11 corresponding to the levitation rotors 31a to 31g is in a low output state.

When it is determined that the magnitude of the speed in the height direction is not equal to or less than the first threshold speed (step S610: NO), the output state determination unit 122 determines whether the magnitude of the velocity of the electric aircraft 20 in the horizontal direction is equal to or less than the second threshold velocity based on the acquired detected value of the velocity sensor 43 (step S620). When it is determined that the magnitude of the speed in the horizontal direction is equal to or less than the second threshold speed (step S620: YES), the output state determination unit 122 determines that the motor 11 corresponding to the propulsion rotors 32a, 32b is in a low output state (step S625), The second threshold speed in step S620 is specified and set in advance by experiments as the minimum speed when the electric aircraft 20 is propelled in the horizontal direction. When the magnitude of the speed in the horizontal direction is equal to or less than the second threshold speed, it is highly possible that the electric aircraft 20 moves upward/downward or maintains its position. Therefore, in this embodiment, in this case, it is determined that the motor 11 corresponding to the propulsion rotors 32a, 32b is in a low output state.

When it is determined that the magnitude of the speed in the horizontal direction is not equal to or less than the second threshold speed (step S620: NO), the output state determination unit 122 determines that all the motors 11 are not in the low output state (step S630). After the completion of step S615, step S625, or step S630, the low output state determination process ends. In the fourth embodiment, the flight altitude of the electric aircraft 20, the speed of the electric aircraft 20 in the height direction, and the speed of the electric aircraft 20 in the horizontal direction correspond to the motor output information of the present disclosure.

The abnormality diagnosis system 120 of the fourth embodiment has the same effect as the abnormality diagnosis system 120 of the first embodiment. In addition, it is determined that the motor 11 corresponding to the levitation rotors 31a to 31g is in a low output state when the flight altitude of the electric aircraft 20 is equal to or higher than the threshold altitude and/or when the magnitude of the speed in the height direction is equal to or lower than the first threshold speed. Therefore, it is possible to accurately determine whether the motor 11 corresponding to the levitation rotors 31a to 31g is in a low output state. Further, when it is determined that the magnitude of the speed in the horizontal direction is equal to or less than the second threshold speed, it is determined that the motor 11 corresponding to the propulsion rotors 32a and 32b is in a low output state. Therefore, it is possible to accurately determine whether the motor 11 corresponding to the propulsion motors 32a and 32b is in a low output state.

E: Other Embodiments (E1) In each embodiment, among the motors 11, the EDS 10 having the motor 11 determined to be in the low output state is set as the diagnosis target EDS, but the present disclosure is not limited to this. When it is determined that even one of the motors 11 is in the low output state, the diagnostic process (step S125) may be executed with all the EDSs 10 as the diagnosis target EDS. With such a configuration, the total time required for the abnormality diagnosis can be shortened.

(E2) In each embodiment, when there are plural EDSs 10 to be diagnosed, the diagnostic processing is executed one by one according to the order specified by the diagnostic order specification processing, but the present disclosure is not limited to this. All of the EDSs 10 may be diagnosed at the same time. In such a configuration, in the diagnostic conditions of step S120, the SOC conditions of the power supply 70 may be determined on the premise that the diagnostic energization is performed in all of the nine EDSs 10.

(E3) In the diagnosis order specification process of each embodiment, priorities for determining the diagnosis order are set from a total of four viewpoints (i) to (iv) below, but some of them may be omitted.
  (i) Scheduled restart time
  (ii) Whether the EDS 10 corresponds to the levitation rotors 31a to 31g
  (iii) Distance from the center of gravity CM
  (iv) Number of diagnosis results of quasi-abnormality For example, the priority of the diagnostic order may be set only by the scheduled restart time. Further, in each embodiment, the priorities given from the above four viewpoints are integrated to obtain the total value, and the diagnosis order is determined based on the total value. However, instead of the integration, each priority value is multiplied, and the diagnostic order may be determined based on the values obtained by the multiplying. Further, the diagnosis order may be set by comparing the largest value or the average value of the priority value in each viewpoint. Further, the total value (priority value) may be obtained by weighting the four viewpoints and then integrating.

Of the four viewpoints (i) to (iv), (ii) and (iii) are viewpoints, in short, "giving a higher priority to the EDS 10 having a large influence when the corresponding EDS 10 is abnormal". In short, (iv) is a viewpoint of "giving a higher priority to the EDS 10 having a high possibility of becoming abnormal based on the history of abnormality diagnosis". Therefore, the priority may be set not only from the above viewpoints (i) to (iv) but also from any other viewpoint if being included in the viewpoints.

Further, the priority may be set in other viewpoints, in place of some of the four viewpoints (i) to (iv), or in addition to the viewpoints. For example, in case where each EDS 10 has redundancy, if some of the redundancy is abnormal or suspected to be abnormal, a higher priority (priority value) may be given to the normal EDS 10 constituting the redundancy compared with the EDS 10 in which all the redundancy is normal.

(E4) In the diagnostic process of each embodiment, the diagnosis based on the sensor detection value before the diagnostic energization (step S410), the resource check of the control unit 13 (step S415, S420), the diagnosis based on the sensor detection value during the diagnostic energization (step S435) and the fail-safe function diagnosis (step S440) may be omitted.

(E5) In each embodiment, the diagnostic condition is "the amount of electric power stored in the power source 70 is a predetermined value or more", but the present disclosure is not limited to this. In place of or in addition to such conditions, the following conditions (a) and (b) may be used.

(a) "Electric aircraft 20 is not in takeoff and landing state"

(b) "The posture and steering angle of the electric aircraft 20 indicates that the electric aircraft 20 is not turning"

In a situation where the above conditions (a) and (b) are not satisfied, if a malfunction occurs in the diagnosis, the impact on the flight will be significant. That is, when the electric aircraft 20 is in a takeoff and landing state and/or when the electric aircraft 20 is turning, if a malfunction of the diagnosis occurs, there is a high possibility that the impact on the flight of the electric aircraft 20 will be significant. Therefore, a diagnostic condition may be set by excluding such a situation.

(E6) In the diagnostic processing of each embodiment, the control unit 13 applies a current of a predetermined magnitude to the extent that the influence on the torque of the motor 11 can be suppressed as a result of energization as a diagnostic energization. However, a current having a magnitude that affects the torque of the motor 11 may be supplied to the motor 11. In such a configuration, when the EDS 10 corresponding to the plural rotors 30 among the levitation rotors 31*a* to 31*g* is the diagnosis target EDS, a part of the rotors 30 is rotated in the normal direction, and the remaining rotors 30 are rotated in the reverse direction. In this case, the total lift can be set to zero and the influence on the movement of the electric aircraft 20 may be suppressed. Further, when the EDS 10 corresponding to the rotors 30 at symmetrical positions is the diagnosis target, the EDS 10 may rotate the motor 11 in the opposite directions to each other. Even in such a configuration, the influence on the movement of the electric aircraft 20 can be suppressed. Further, when the electric aircraft 20 is turning, the rotation direction of the motor 11 may be controlled according to the turning direction. For example, the motor 11 may be turned counterclockwise while the electric aircraft 20 is turning counterclockwise, and the motor 11 may be turned clockwise while the electric aircraft 20 is turning clockwise. Even in such a configuration, it is possible to suppress the influence on the turning operation of the electric aircraft 20.

(E7) In the fourth embodiment, the velocity in the height direction and the velocity in the horizontal direction are used in order to determine whether the output is low, but the present disclosure is not limited to this. An acceleration in the height (vertical) direction and an acceleration in the horizontal direction may be used. For example, when the acceleration in the height direction becomes equal to or less than a predetermined magnitude or decreases by a predetermined magnitude, it may be determined that the motor 11 corresponding to the levitation rotors 31*a* to 31*g* is in a low output state. Further, when the acceleration in the horizontal direction becomes a predetermined magnitude or more or increases by a predetermined magnitude, it may be determined that the motor 11 corresponding to the levitation rotors 31*a* to 31*g* is in a low output state.

(E8) In the first embodiment, the electric aircraft 20 has a fixed wing (main wing 25), but may have a tilt type wing. The rotor 30 may be installed on the tilt type wing. In this configuration, for example, when the right wing 26 or the left wing 27 of the first embodiment is tilt type, in the state of FIG. 1, the rotors 31*f* and 31*g* function for levitation and the rotors 32*a* and 32*b* function for propulsion. When the right wing 26 and the left wing 27 rotate 90 degrees from the state of FIG. 1, the rotors 31*f* and 31*g* function for propulsion, and the rotors 32*a* and 32*b* function for levitation. In such a configuration, it can be determined whether each rotor contributes to the horizontal movement or the vertical movement based on the tilt angles of the right wing 26 and the left wing 27, and the low output state is determined in combination with the operation mode. Specifically, when it is not in the first drive mode, that is, in the case of only the second drive mode or the third drive mode, it can be determined that the motor 11 corresponding to the rotor that contributes to the vertical movement is in a low output state. Further, when it is not in the second drive mode, that is, in the case of only the first drive mode or the third drive mode, it can be determined that the motor 11 corresponding to the rotor contributing to the horizontal movement is in a low output state. The configuration described above can be similarly applied to an aircraft having a tilt rotor.

(E9) The motor output information is the mode of the driving force of the electric aircraft 20 in the first embodiment. The motor output information is the control mode of the EDS 10 in the second embodiment. The motor output information is the instructed output value to each EDS 10, the motor current value, the motor rotation speed, and the rotation angle in the third embodiment. The motor output information is the flight altitude of the electric aircraft 20, the speed of the electric aircraft 20 in the height direction, and the speed of the electric aircraft 20 in the horizontal direction in the fourth embodiment. However, this disclosure is not limited to these. For example, the detection result of the posture sensor 44 may be used as the motor output information. Specifically, when the detection result of the posture sensor 44 deviates from the target posture range, for example, deviates from the target range of the angle formed between the ground and the aircraft axis AX, it may be determined that all the motors 11 are in the low output state. When the posture of the electric aircraft 20 is out of the target range, the control mode of the EDS 10 may be changed to the abnormal mode due to some abnormality, and the output of the motor 11 may be limited. Alternatively, because the output of the motor 11 is low, the posture may not be stable and may be out of the target range.

(E10) The configurations of the abnormality diagnosis system 120, the EDS 10, the flight control device 100, and the like in each embodiment are merely examples and can be changed in various ways. For example, the abnormality diagnosis system 120 is not limited to the electric aircraft 20, and may be mounted on an electric vehicle such as an automobile or a train, or an arbitrary mobile body such as a ship. Further, the EDS 10 may be configured not to include the motor 11. The integrated control unit 110 may be configured by, for example, a server device installed in a control tower on the ground without being mounted on the electric aircraft 20. In such a configuration, each EDS 10 and the abnormality diagnosis system 120 may be controlled by communication via the communication device 60. Further, for example, in each embodiment, the first to third drive modes are prepared in advance as the mode of the driving force of the electric aircraft 20, but the third drive mode may not be prepared in advance. For example, in case where "nothing is set" is allowed as the mode of the driving force of the electric aircraft 20, in step S210 of the low output state determination process in the first embodiment, it is determined "whether the specified drive mode includes neither the first drive mode nor the second drive mode", instead of "whether the specified mode is the third mode." Then, when it is determined that "the specified mode does not include either the first drive mode or the second drive mode", step S215 is executed. When it is determined that "the specified mode includes the first drive mode or the first drive mode", step S220 and subsequent steps may be executed.

(E11) The integrated control unit 110, the abnormality diagnostic system 120 and the methods described in the present disclosure may be realized by a dedicated computer having a processor and memory programmed to perform one or more functions embodied by a computer program. Alternatively, the integrated control unit 110, the abnormality diagnostic system 120 and the methods described in the present disclosure may be realized by a dedicated computer provided by configuring a processor with one or more dedicated hardware logic circuits. Alternatively, the integrated control unit 110, the abnormality diagnostic system 120 and the methods described in the present disclosure may be realized by one or more dedicated computers configured by a combination of the processor and memory programmed to perform one or more functions and the processor having one or more hardware logic circuits. Furthermore, the computer program may be stored in a computer-readable non-transitory tangible storage medium as an instruction executed by the computer.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. An abnormality diagnosis system configured to diagnose an abnormality of an electric drive system to drive a motor for moving a mobile body, the abnormality diagnosis system comprising:
    an information acquisition unit configured to acquire a motor output information which is information related to an output state of the motor;
    an output state determination unit configured to determine whether the output state of the motor is a low output state that does not contribute to a movement of the mobile body by using the motor output information; and
    a diagnosis execution unit configured to diagnose an abnormality of the electric drive system when it is determined that the motor is in the low output state.

2. The abnormality diagnosis system according to claim 1, wherein
    the mobile body comprises a plurality of electric drive systems to drive a plurality of motors respectively,
    the output state determination unit determines whether the motor is in the low output state in each of the plurality of electric drive systems, and
    when the output state of some of the plurality of motors is determined to be in the low output state, the diagnosis execution unit diagnoses an abnormality for an electric drive system that drives the motor determined to be in the low output state.

3. The abnormality diagnosis system according to claim 1, wherein
    the mobile body is an electric aircraft having
        a plurality of motors,
        a plurality of electric drive systems for driving the plurality of motors respectively, and
        a plurality of rotors rotationally driven by the plurality of motors respectively.

4. The abnormality diagnosis system according to claim 3, wherein
    the electric aircraft further includes an integrated control unit that controls the plurality of electric drive systems,
    the plurality of rotors includes at least a levitation rotor and a propulsion rotor,
    the integrated control unit controls the plurality of electric drive systems to set at least one of a plurality of drive modes as a mode of a driving force of the electric aircraft, the plurality of drive modes including a first drive mode in which the motor is driven to raise and lower the electric aircraft in a vertical direction, and a second drive mode in which the motor is driven to realize a propulsion of the electric aircraft in a horizontal direction,
    the information acquisition unit acquires the drive mode as the motor output information,
    the output state determination unit determines that the output state of the motor corresponding to the propulsion rotor is the low output state when the mode of the driving force is only the first drive mode, and
    the output state determination unit determines that the output state of the motor corresponding to the levitation rotor is the low output state when the mode of the driving force is only the second drive mode.

5. The abnormality diagnosis system according to claim 4, wherein
    when the mode of the driving force does not include either the first drive mode or the second drive mode, the output state determination unit determines that each of the plurality of motors is in the low output state.

6. The abnormality diagnosis system according to claim 1, wherein
    the mobile body is an electric aircraft having a plurality of motors, a plurality of electric drive systems for driving the plurality of motors respectively, a plurality of rotors rotationally driven by the plurality of motors respectively, and an integrated control unit to control the plurality of electric drive systems,
    the information acquisition unit acquires a drive command transmitted from the integrated control unit to the plurality of electric drive systems as the motor output information, and
    the output state determination unit determines that the motor is in the low output state when the acquired drive command is an instruction to drive the motor so that the output state becomes the low output state.

7. The abnormality diagnosis system according to claim 1, wherein
    the mobile body comprises a plurality of electric drive systems,
    the output state determination unit determines whether each of a plurality of motors driven by the plurality of electric drive systems is in the low output state, and when at least two of the motors are determined to be in the low output state, the diagnosis execution unit simultaneously diagnoses abnormality for the electric drive systems for driving the at least two of the motors.

8. The abnormality diagnosis system according to claim 1, wherein the mobile body comprises a plurality of electric drive systems, the output state determination unit determines whether each of a plurality of motors driven by the plurality of electric drive systems is in the low output state, and when at least two of the motors are determined to be in the low output state, the diagnosis execution unit determines an execution order of abnormality diagnosis based on at least one of a scheduled restart time at which each of the motors changes from the low output state to a state contributing to the movement of the mobile body, a magnitude of influence caused by abnormality in the electric drive system for driving each of the motors, and a history of abnormality diagnosis in the electric drive system for driving each of the motors.

9. The abnormality diagnosis system according to claim 8, further comprising:

a scheduled restart time specification unit configured to specify the scheduled restart time of the motor for each of the plurality of motors whose output state is determined to be in the low output state, wherein the diagnosis execution unit conducts an abnormality diagnosis earlier in the electric drive system for driving the motor having an early scheduled restart time than in the electric drive system for driving the motor with a late scheduled restart time.

10. The abnormality diagnosis system according to claim 8, wherein the mobile body is an electric aircraft having a plurality of motors, a plurality of electric drive systems for driving the plurality of motors respectively, and a plurality of rotors rotationally driven by the plurality of motors respectively, the plurality of rotors includes at least a levitation rotor and a propulsion rotor, and the diagnosis execution unit conducts an abnormality diagnosis earlier in the electric drive system corresponding to the levitation rotor than in the electric drive system corresponding to the propulsion rotor.

11. The abnormality diagnosis system according to claim 8, wherein the mobile body is an electric aircraft having a plurality of motors, a plurality of electric drive systems for driving the plurality of motors respectively, and a plurality of rotors rotationally driven by the plurality of motors respectively, the plurality of rotors includes a plurality of levitation rotors, and the diagnosis execution unit conducts an abnormality diagnosis earlier in the electric drive system corresponding to the levitation rotor at a position where a distance from a center of gravity of the electric aircraft is relatively long than in the electric drive system corresponding to the levitation rotor at a position where the distance from the center of gravity of the aircraft is relatively short.

12. The abnormality diagnosis system according to claim 1, wherein the diagnosis execution unit conducts an abnormality diagnosis in the electric drive system, which is a diagnosis target, by energizing the motor so that an output of the motor does not contribute to the movement of the mobile body.

* * * * *